US008982908B1

(12) United States Patent
Shukla et al.

(10) Patent No.: US 8,982,908 B1
(45) Date of Patent: Mar. 17, 2015

(54) EXTENSION OF PATH REPLY MESSAGE TO ENCODE MULTIPLE ROUTE INFORMATION IN A MESH NETWORK

(75) Inventors: Ashish Kumar Shukla, Pune (IN); Sandesh Goel, Pune (IN)

(73) Assignee: Marvell International Ltd., Hamilton (BM)

( * ) Notice: Subject to any disclaimer, the term of this patent is extended or adjusted under 35 U.S.C. 154(b) by 1361 days.

(21) Appl. No.: 12/625,279

(22) Filed: Nov. 24, 2009

Related U.S. Application Data

(60) Provisional application No. 61/118,739, filed on Dec. 1, 2008.

(51) Int. Cl.
*H04J 3/24* (2006.01)
*H04L 12/28* (2006.01)

(52) U.S. Cl.
USPC ............ 370/473; 370/389; 370/390; 370/401

(58) Field of Classification Search
None
See application file for complete search history.

(56) References Cited

U.S. PATENT DOCUMENTS

| | | | | |
|---|---|---|---|---|
| 6,950,394 | B1 * | 9/2005 | Chou et al. .................. | 370/229 |
| 8,068,481 | B2 * | 11/2011 | Boers et al. .................. | 370/370 |
| 2007/0115828 | A1 * | 5/2007 | Ahuja et al. .................. | 370/236 |
| 2007/0248067 | A1 * | 10/2007 | Banerjea et al. ............. | 370/338 |
| 2009/0135824 | A1 * | 5/2009 | Liu ............................ | 370/392 |
| 2009/0245253 | A1 * | 10/2009 | Chen et al. .................. | 370/390 |
| 2009/0310616 | A1 * | 12/2009 | Cummings et al. .......... | 370/401 |
| 2009/0316668 | A1 * | 12/2009 | Bahr et al. .................. | 370/338 |

FOREIGN PATENT DOCUMENTS

WO WO 2008006882 A1 * 1/2008
WO WO-2009/006188 A1 1/2009

OTHER PUBLICATIONS

"802.11s Proposal—Joint SEE-Mesh/Wi-Mesh Proposal to 802.11 TGS," IEEE 802.11-06/0328r0, (2006). Retrieved from the Internet on Nov. 24, 2009, URL:http://www.docstoc.com/docs/16783552/80211s-Proposal---Joint-SEE-MeshWi-Mesh-Proposal-to-80211-TGs.
"HWMPplus," From MikroTik Wike (2009). Retrieved from the Internet on Nov. 24, 2009: URL:http://wiki.mikrotik.com/wiki/HWMP%2B.
Hybrid Wireless Mesh Protocol (HWMP), IEEE 802.11a Tutorial, pp. 40-43, (2006). URL:http://www.ieee802.org/802_tutorials/06-November/802.11s_Tutorial_r5.pdf.
Camp et al., "The IEEE 802.11s Extended Service Set Mesh Networking Standard," IEEE Communications Magaizine, 46(8):120-126 (2008).

(Continued)

*Primary Examiner* — John Blanton
*Assistant Examiner* — Thinh Tran

(57) ABSTRACT

An apparatus includes a memory to store routing information, and a control unit configured to examine routing information stored in the memory for routing information corresponding to one or more destination nodes in a plurality of destination nodes in response to a message requesting routing information for routes between an originating node and the plurality of destination nodes. If routing information for multiple destination nodes in the plurality of destination nodes is stored in the memory, the control unit generates an information element that includes routing information for the multiple destination nodes, and causes a single message that includes the information element to be generated.

16 Claims, 8 Drawing Sheets

(56) References Cited

OTHER PUBLICATIONS

Gafni et al., "Distributed Algorithms for Generating Loop-Free Routes in Network with Frequently Changing Topology," IEEE Transactions on Communications, 29(1):11-18 (1981). Retrieved from the Internet on Nov. 24, 2009. URL:http://wiki.uni.lu/secan-lab/Gafni-Bertsekas.html.

Geier, "802.11 Data Frames Revealed," Wi-Fi Planet, (2004). Retrieved from the Internet on Nov. 24, 2009. URL:http://www.wi-fiplanet.com/tutorials/article.php/3442991.

Ghannay et al., "Comparison of Proposed Path Selection Protocols for IEEE 802.11s WLAN Mesh Networks," Wireless and Mobile Networking, 284:17-28 (2008). Only first page was retrieved from the Internet and reviewed. Retrieved from the Internet on Nov. 24, 2009: URL:http://springerlink.com/content/e66mg773874lhw67/.

Gyires, "A Multi-Path Selection Protocol in Fourth Generation Wireless Networks," Wireless Communication and Networking Conference (2007). Only abstract was retrieved from Internet and reviewed. Retrieved from the Internet on Nov. 24, 2009: URL:http://ieeexplore.ieee.org/xpl.freeabs_all.jsp?arnumber=4224984.

Harkins et al., "Update Mesh Group Key Handshake Protocol," IEEE P802.11 Wireless LANs, pp. 1-10 (2009).

IEEE P802.11s TM /D2.0 "Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment <number>: Mesh Networking," The Institute of Electrical and Electronics Engineers, Inc. (2008).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., (1999).

Joshi et al., "HWMP Specification," IEEE P802.11 Wireless LANs, pp. 1-26 (2006).

Loeser et al., "Distributed Path Selection (DPS) A Traf.c Engineering Protocol for IP-Networks," Proceedings of the 37th Annual Hawaii International Conference on System Sciences (HICSS'04)—Track 7, (2004) Retrieved from the Internet on Nov. 24, 2009: URL:http://www.computer.org/portal/web/csdl/doi/10.1109/HICSS.2004.1265481.

Tranzeo Wireless Technologies, Inc., "Example Community Broadband Wireless Mesh Network Design," Version 1.1:20 (2007). URL:http://www.tranzeo.com/products/docs/EnRoute500-Mesh-sample-design-report.pdf.

* cited by examiner

EXTENSION OF PATH REPLY MESSAGE TO ENCODE MULTIPLE ROUTE INFORMATION IN A MESH NETWORK

CROSS REFERENCE TO RELATED APPLICATION

This application claims the benefit of U.S. Provisional Patent Application No. 61/118,739, filed Dec. 1, 2008, which is entitled "Extension of Path Reply Action Frame to Encode Multiple Routes Information in Mesh network." The disclosure of the above-identified application is hereby expressly incorporated herein by reference.

TECHNICAL FIELD

The present disclosure relates generally to communicating routing information in a mesh network and, more particularly, to more efficiently communicating routing information between an originating node and multiple destination nodes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mesh network is a network of nodes that each maintains logical route connections to nearby nodes. Mesh nodes are sometimes referred to herein as mesh points or MPs. The connection from one mesh node to another node that is not a neighboring node is accomplished by linking consecutively adjacent nodes to the destination node according to a route. In this manner, mesh nodes working together in a mesh network enable communications over potentially large physical areas. Mesh networks were developed to improve system reliability by offering improved redundancy in system networks. If one mesh node fails, the rest of the nodes in the mesh network are able to communicate with each other via alternative routes. Mesh nodes may use a protocol that enables each node to reconfigure itself with updated route information that the node stores in its own routing table. Connections between mesh nodes may be wired or wireless, though generally the connections are wireless. Mesh networks allow for an extensible and flexible network architecture that may be used in offices, educational institutions, areas of public access, residential areas, public safety systems, military systems, etc.

A mesh network may be made entirely of mesh nodes that only adhere to mesh protocols. On the other hand, mesh networks may include an entry or access node to a different network, such as the Internet, a private local area network (LAN), etc. so that other protocols may also be integrated into the mesh network. An example of a developed mesh protocol is the Hybrid Wireless Mesh Protocol (HWMP) set forth in the Institute for Electrical and Electronic Engineers (IEEE) 802.11s draft standard.

SUMMARY

In one embodiment, a method including receiving a message requesting routing information for routes between an originating node and a plurality of destination nodes, examining routing information stored in a computer readable memory for routing information corresponding to one or more of the destination nodes in the plurality of destination nodes in response to the message requesting routing information, if routing information for multiple destination nodes in the plurality of destination nodes is stored in the computer readable memory, generating an information element that includes routing information for the multiple destination nodes, and transmitting the information element in a single message.

In one embodiment, a method including transmitting a single message requesting routing information for routes between an originating node and a plurality of destination nodes, and in response to the single message requesting routing information for routes between the originating node and the plurality of destination nodes, receiving a single message having an information element that includes routing information for multiple destination nodes in the plurality of destination nodes.

In one embodiment, an apparatus including a memory to store routing information, and a control unit configured to examine routing information stored in the memory for routing information corresponding to one or more destination nodes in a plurality of destination nodes in response to a message requesting routing information for routes between an originating node and the plurality of destination nodes, and if routing information for multiple destination nodes in the plurality of destination nodes is stored in the memory, to generate an information element that includes routing information for the multiple destination nodes, and to cause a single message that includes the information element to be generated.

In other embodiments, the apparatus may include one or more of the following. The information element that includes routing information for the multiple destination nodes may include a field to indicate that the information element includes routing information for more than one destination node. The field to indicate that the information element includes routing information for more than one destination node may include a value corresponding to a number of destinations nodes for which routing information is included in the information element. The routing information may include, for each of the multiple destination nodes, a corresponding path metric for a route between an originating node and the corresponding destination node. The routing information includes, for each of the multiple destination nodes, a corresponding hop count for a route between an originating node and the corresponding destination node. The information element may include a proxied address indicator for each of the multiple destination nodes; and if the proxied address indicator for one of the multiple destination nodes indicates a proxied address is included, the information element may include the proxied address for the one destination node in the information element. The apparatus may further comprise a transceiver to receive the message requesting routing information for routes between an originating node and the plurality of destination nodes and to transmit the single message that includes the information element. The control unit may comprise a processor capable of executing machine readable instructions.

DRAWINGS

DESCRIPTION

Figure 1:
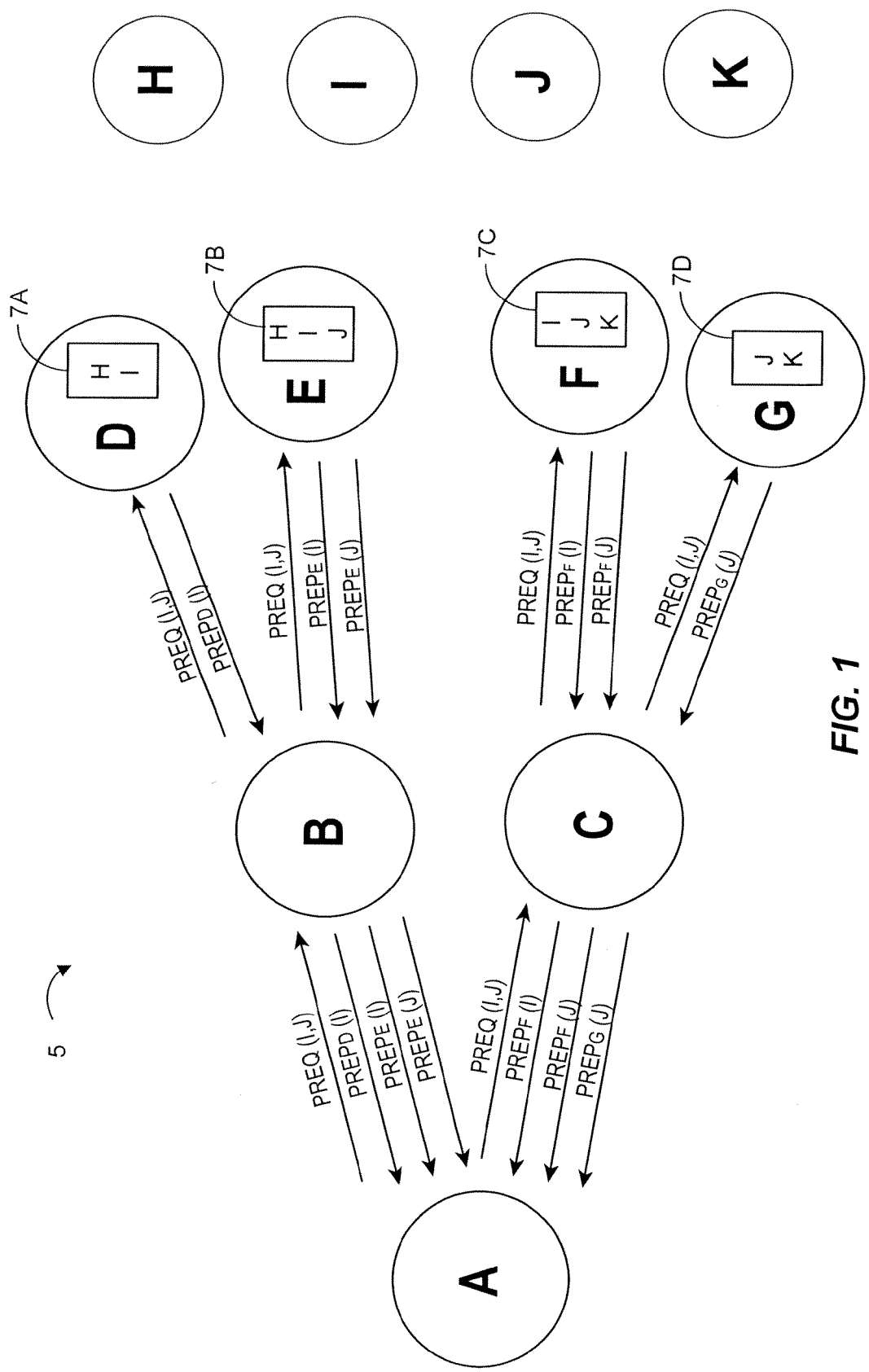
FIG. 1 is a diagram of mesh nodes operating according to an example embodiment of an enhanced mesh communication protocol implementing an enhanced Path Request (PREQ) with a standard Path Response (PREP).

With improvements in communication technology, the amount of traffic handled by mesh nodes has increased along with the number of mesh nodes that are assigned to a particular geographic location. This causes some geographic locations to become densely populated with mesh nodes. The IEEE 802.11s draft standard integrates mesh networking services and protocols with the IEEE 802.11 standard MAC layer protocol. The mesh protocol is extensible to allow support for diverse applications and future innovation.

In a mesh network, the amount of traffic handled by the communication channels associated with the network increases as the network becomes more populated with additional mesh nodes. It is typically beneficial to reduce unnecessary traffic, if possible, to save bandwidth for applications that require more continuous use of the available channels for application such as voice or video distribution.

A common type of messaging that occurs over a mesh network is messaging between nodes that is used to establish routes between mesh nodes. Mesh nodes may send messages to establish routes to different destinations and/or to share routing information with other mesh nodes. One example protocol that is used for establishing routing information is the hybrid wireless mesh protocol (HWMP). The HWMP protocol combines the flexibility of an on-demand routing mode and a proactive topology tree extension mode. These modes are not exclusive. On-demand and proactive modes may be used concurrently. The proactive mode involves a root mesh node (or root node) proactively finding routes to all other mesh nodes in the network. The proactive mode may be used by a mesh node that is an access node (i.e., a mesh node with a connection to another network such as a local area network (LAN), a wide area network (WAN), etc., and which allows the mesh network to communicate outside of the mesh network), for example, to establish routes from all mesh nodes in the network to the access node.

The on-demand routing mode may be used in situations in which a mesh node (a source node) wishes to send information to another mesh node (a destination node) but does not have routing information for the destination node. The on-demand routing mode can be performed by using a Path Request (PREQ) mechanism of the IEEE 802.11s draft standard. The proactive mode can be performed by using either a Route Request (RREQ) mechanism or a Root Announcement (RANN) mechanism of the IEEE 802.11s draft standard.

According to the IEEE 802.11s draft standard, if a source node needs to find a path or route and to discover link metric information from a source node to a destination node using the on-demand routing mode, the source node may broadcast PREQ message with the destination node specified in a destination list of the message. As described below in the enhanced mesh protocol described herein, a single enhanced PREQ message may be used to find a route for multiple destination mesh nodes. For instance, an enhanced PREQ message can list multiple destination nodes, indicating a request for routing information for the multiple destination nodes.

FIG. 1 is a diagram of a plurality of the mesh nodes in a mesh network 5. In particular, FIG. 1 illustrates messaging that takes place in an example scenario employing on-demand routing with the enhanced PREQ mechanism. In FIG. 1, mesh node A wishes to obtain route information for mesh nodes I and J. Thus, mesh node A broadcasts an enhanced PREQ message (i.e., a management frame with a PREQ information element having a Multiple Destination field set to 1) to obtain route information for mesh node I and mesh node J.

The behavior of the intermediary mesh nodes or nodes, B, C, D, E, F, and G may be controlled with flags, such as a Destination Only (DO) flag that is part of the PREQ destination element defined by the IEEE 802.11 draft standard. If the intermediary mesh node receives the PREQ message with a DO flag that is not set (i.e., D=0), then the intermediary mesh nodes B, C, D, E, F, G may answer the PREQ message with a Path Reply (PREP) message if the intermediary node has path information for any of the destination mesh nodes (e.g., I, J). In the scenario of FIG. 1, intermediary mesh nodes B and C do not have routing information for mesh nodes I and J, whereas mesh nodes D, E, F, G do have routing information for at least one of mesh nodes I and J, as indicated in the respective routing tables 7 of each intermediary mesh node D, E, F, G. For example, mesh node D has route information in its table 7A for mesh nodes H and I. Mesh node E has route information in its table 7B for mesh nodes H and I and J. Mesh node F has route information in its table 7C for mesh nodes I and J and K. Mesh node G has route information in its table 7D for mesh nodes J and K.

Another flag in the PREQ message, the Reply and Forward (RF) flag, may also be used to control the behavior of intermediary nodes. If the RF flag is set to 1, and the DO flag is set to 0, then an intermediate node may respond with a PREP message if the intermediate node has route information, but the intermediate node must also re-broadcast the PREQ message.

As shown in FIG. 1, when a mesh node originator A requires route information for a plurality of destination mesh nodes that are located within the mesh network (e.g., mesh nodes I, J), mesh node A will check its local forwarding table for an active forwarding entry associated with mesh node I and mesh node J. In the scenario of FIG. 1, mesh node A has no routing information for mesh nodes I and J. Thus, mesh node A broadcasts an enhanced PREQ message including a request for routing information for mesh nodes I and J with, for example, the RF flag set to 1 and the DO flag set to 0.

For example, mesh nodes B and C are in vicinity to receive the PREQ message from mesh node A but do not have any routing information for either destination mesh nodes I or J. Therefore, intermediary mesh nodes B and C do not reply immediately to mesh node A but also re-broadcast the enhanced PREQ message to other mesh nodes within their range. For example, mesh nodes D and E receive the enhanced PREQ message from mesh node B, and mesh nodes F and G receive the enhanced PREQ message from mesh node C. Whenever an intermediate node, such as B and C receives a enhanced PREQ message, the mesh node learns a path back to the originating mesh node A. This learned path is a reverse path, which the mesh node may use later to forward Path Reply (PREP) messages (or enhanced PREP messages) to the originating mesh node A, as will be described subsequently. PREP messages are sent via unicast along the reverse path.

Because mesh nodes D, E, F, and G have routing information for either destination I or J, or both, these mesh nodes reply to the enhanced PREQ messages from mesh nodes B and C with a PREP message to establish a bidirectional path for data forwarding. In this example, because mesh node D has routing information for destination mesh node I, mesh node D sends back a PREP message including routing information for mesh node I. Because mesh node E has routing information for both mesh nodes I and J, mesh node E sends back two PREP messages, one indicating the routing information to destination mesh node I and another indicating routing information for destination mesh node J. Mesh node F responds similarly to mesh node E and mesh node G responds similar to mesh node D, but instead sending routing information for destination mesh node J.

Mesh nodes D, E, F, and G also may rebroadcast the enhanced PREQ message, which may cause further PREP messages to be generated and sent within the network 10. These additional enhanced PREQ and PREP messages are not illustrated in FIG. 1 for clarity.

Mesh node B receives the PREP messages from mesh nodes D and E, and forwards the routing information to the originator mesh node A. Mesh node C similarly receives the PREP messages from mesh nodes F and G, and forwards the routing information to the originator mesh node A.

Mesh node A then obtains routing information from the PREP messages and adds routing information for mesh nodes I and J to its forwarding table for future communications with mesh nodes I and J. In the IEEE 802.11s draft standard, the scenario depicted in FIG. 1 requires each of mesh nodes E and F to send two PREP messages in response to one enhanced PREQ message, and in certain situations mesh nodes B and C to send more than one PREP message for the same destination. The multiple PREP responses can have an effect on the amount of traffic of the network. As the number of route requests increases, the numbers of PREP responses may be problematic depending on the circumstances. This is especially true in densely populated mesh networks.

Figure 2:
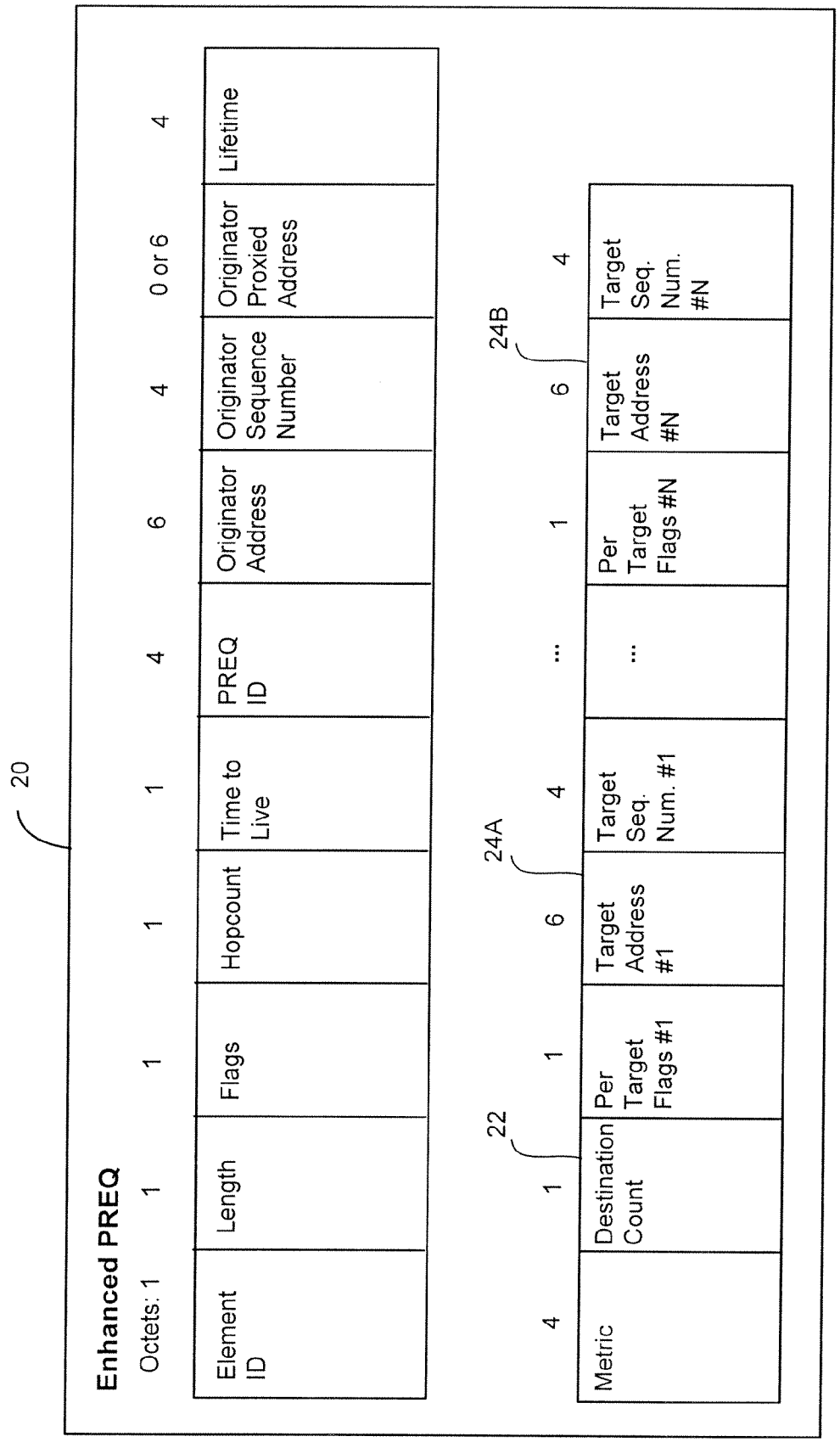
FIG. 2 is a diagram of an example enhanced Path Request (PREQ) information element used to request multiple route information.

FIG. 2 is a diagram of an enhanced PREQ information element 20 that is used to find route information for N destination mesh nodes. As shown in FIG. 2, the enhanced PREQ information element 20 includes a destination count field 22 used to indicate the number of destination mesh nodes for which route information is being sought. Additionally, the example enhanced PREQ information element 20 include one or more fields 24A to indicate the addresses of destination mesh nodes for which routing information is being sought. Tables 1 and 2 provide a further explanation of the fields used in the example enhanced PREQ information element 20.

TABLE 1

| Field | Explanation |
| --- | --- |
| Element ID | Set to the value given in the IEEE 802.11s draft standard for this information element. |

TABLE 1-continued

| Field | Explanation |
| --- | --- |
| Length | Indicates the length of the PREQ information element. May be set to 37 to 255 octets. |
| Flags | Bit 0: Portal Role (0 = non-portal, 1 = portal), Bit 1: (0 = group addressed, 1 = individually addressed)), Bit 2: Proactive PREP (0 = off, 1 = on), Bit 3 - 5: Reserved, Bit 6: Address Extension (AE) (1= (destination count == 1 && proxied device address present), 0 = otherwise), Bit 7: Set to one to indicate multiple destinations requested, zero otherwise. |
| Hop Count | An unsigned integer set to the number of hops from the originator to the mesh node transmitting the request. |
| Time to Live | An unsigned integer set to the maximum number of hops allowed for this information element. |
| PREQ ID | An unsigned integer set to some unique identifier (ID) for this PREQ information element. |
| Originator Address | A 48-bit address as defined in 5.2 of the IEEE 802-1990 Standard, and is set to the originator MAC address. |
| Originator Sequence Number | An unsigned integer set to a sequence number specific to the originator. |
| Proxied Address | The media access control (MAC) address of a proxied entity in case the PREQ is generated because of a frame received from outside the mesh (e.g. basic service set (BSS)) and the proxied entity is the source of the frame. This field is only present if the AE flag is set to 1 and is represented as a 48-bit address a defined in 5.2 of the IEEE 802-1990 Standard. |
| Lifetime | An unsigned integer set to the time for which mesh nodes receiving the PREQ consider the forwarding information to be valid. |
| Metric | An unsigned integer set to the cumulative metric from the originator to the mesh node transmitting the PREQ. |
| Destination Count N | An unsigned integer that gives the number of Destinations (N) contained in this PREQ. |
| Per Destination Flags | The format of the Per Destination Flags field is shown in Table 2. |
| Target or Destination Address | The MAC address of the destination mesh node and is represented as a 48-bit address as defined in 5.2 of the IEEE 802-1990 Standard. |
| Target or Destination Seq. Number | An unsigned integer that is the latest sequence number received in the past by the originator for any path towards the destination. |

TABLE 2

(Per Destination Flags)

| Bit | Explanation |
| --- | --- |
| 0 | Target Only or Destination Only (TO or DO) bit (bit 0) defines which mesh node is allowed to respond to the PREQ element containing an individual target address with a PREP element. If TO = 1, only the target mesh node shall respond with an individually addressed PREP. If TO = 0, also intermediate mesh STAs with active forwarding information to the target mesh STA are allowed to respond. |
| 1 | Reply and Forward (RF) bit (bit 1) controls the propagation of the PREQ element at intermediate mesh STAs. When TO = 0 and the intermediate mesh STA has responds with a PREP element to the corresponding target, the PREQ is not propagated if RF=0 and propagated if RF = 1. When TO = 1, the RF bit has no effect. |
| 2 | USN (Unknown Target HWMP Sequence Number): The USN flag indicates whether the Target HWMP Sequence Number field of the corresponding target can be interpreted as HWMP sequence number (USN = 0) or not (USN = 1), the latter meaning that a target HWMP sequence number is unknown at the originator mesh STA. |
| 3-6 | Reserved |

TABLE 2-continued (Per Destination Flags)

| Bit | Explanation |
|---|---|
| 7 | MD (Multiple Destinations) set to 1 if multiple destination replies requested, 0 otherwise. |

When an intermediate node receives an enhanced PREQ message and is to forward the enhanced PREQ message, the intermediate node replaces PREQ transmitter address with its own address to the enhanced PREQ message, increments the hopcount field, and may unicast or rebroadcast the enhanced PREQ message. When an intermediate node receives an enhanced PREQ message, has routing information in its routing table, and is to reply to the enhanced PREQ message, the intermediate node may determine a route to the destination address using information in the routing table of the intermediate node and address information from the enhanced PREQ message. Then, the intermediate node generates a PREP message that includes routing information for the destination node, and unicasts the enhanced PREP message along the route corresponding to the routing information toward the originator of the enhanced PREQ message.

Similarly, when one or more enhanced PREQ messages reach a destination node, the destination node examines the hop counts, metrics, addresses, etc., to select a path back to the source node. Then, the destination node generates a PREP message that includes routing information for the destination node, and unicasts the PREP message along the route corresponding to the routing information toward the originator of the enhanced PREQ message.

The enhanced PREQ information element 20 may be transmitted to a peer mesh node via either unicast or broadcast. A "unicast PREQ" is a PREQ element contained in a management frame that is unicast to a peer mesh node. A "broadcast PREQ" is a PREQ element contained in a management frame that is broadcast to all peer mesh nodes.

Figure 3A:
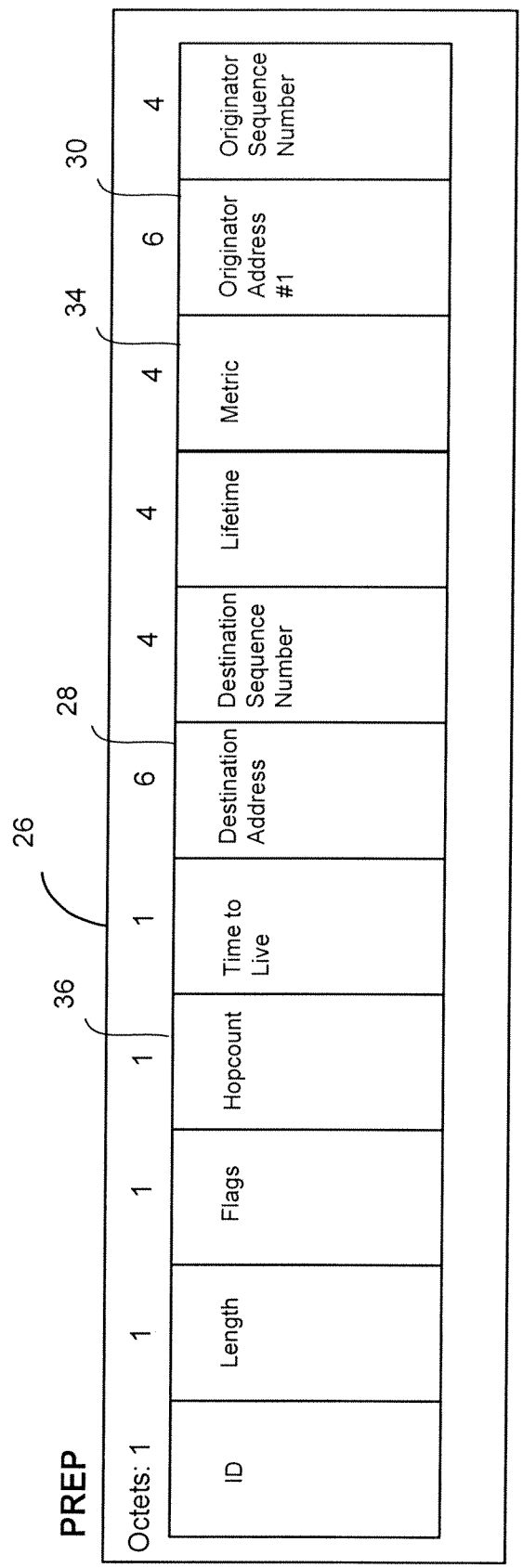
FIG. 3A is a diagram of a Path Response (PREP) information element set forth in the IEEE 802.11s draft standard.

FIG. 3A is a diagram of a PREP information element 26 of a prior art PREP message according to the IEEE 802.11s draft standard. The PREP information element 26 is used to provide routing information for a destination node. The PREP information element 26 helps establish a forward path to a destination node and to confirm that the destination node is reachable. The prior art PREP information element 26 only includes route information for a single destination node. The Destination Address field 28 indicates the destination node indicated in the original PREQ information element, and the originator address 30 indicates the sender of the PREQ information element. Other nodes in the path to the destination node may append an identifier (such as a wireless MAC address) and/or replace the PREQ transmitter address with their own address and/or increment the hop count value and rebroadcast the PREQ information element. When the destination node receives the PREQ information element, the destination node can examine information, such as the hop count, node identifiers, and other information in the messages, to select a path back to the source node.

TABLE 3

| Field | Explanation |
|---|---|
| Element ID | Value given for this information element. |
| Length | An indicator of the length of the information element, set to 32 to 1412 bytes. |
| Flags | Bit 0-7: Reserved. |

TABLE 3-continued

| Field | Explanation |
|---|---|
| Hop Count | An unsigned integer set to the number of hops from the path destination to the local MP. |
| Time to Live | An unsigned integer set to the maximum number of hops allowed for this element. |
| Destination MP Address | The MAC address of the destination node for which a path is supplied and is represented as a 48-bit address as defined in 5.2 of the IEEE 802-1990 Standard. |
| Destination Sequence Number (DSN) | An unsigned integer set to the DSN of the target of the PREQ. |
| Lifetime | If applicable, reflects the Lifetime of the PREQ this PREP responds to and is coded as unsigned integer. |
| Metric | An unsigned integer that indicates the cumulative metric from the path destination to the local MP. |
| Originator Address | A 48-bit address as defined in 5.2 of the IEEE 802-1990 Standard and is set to the MAC address of the originator of the PREQ. |
| Originator Sequence Number | An unsigned integer set to the sequence number of the originator of the PREQ. |

Figure 3B:
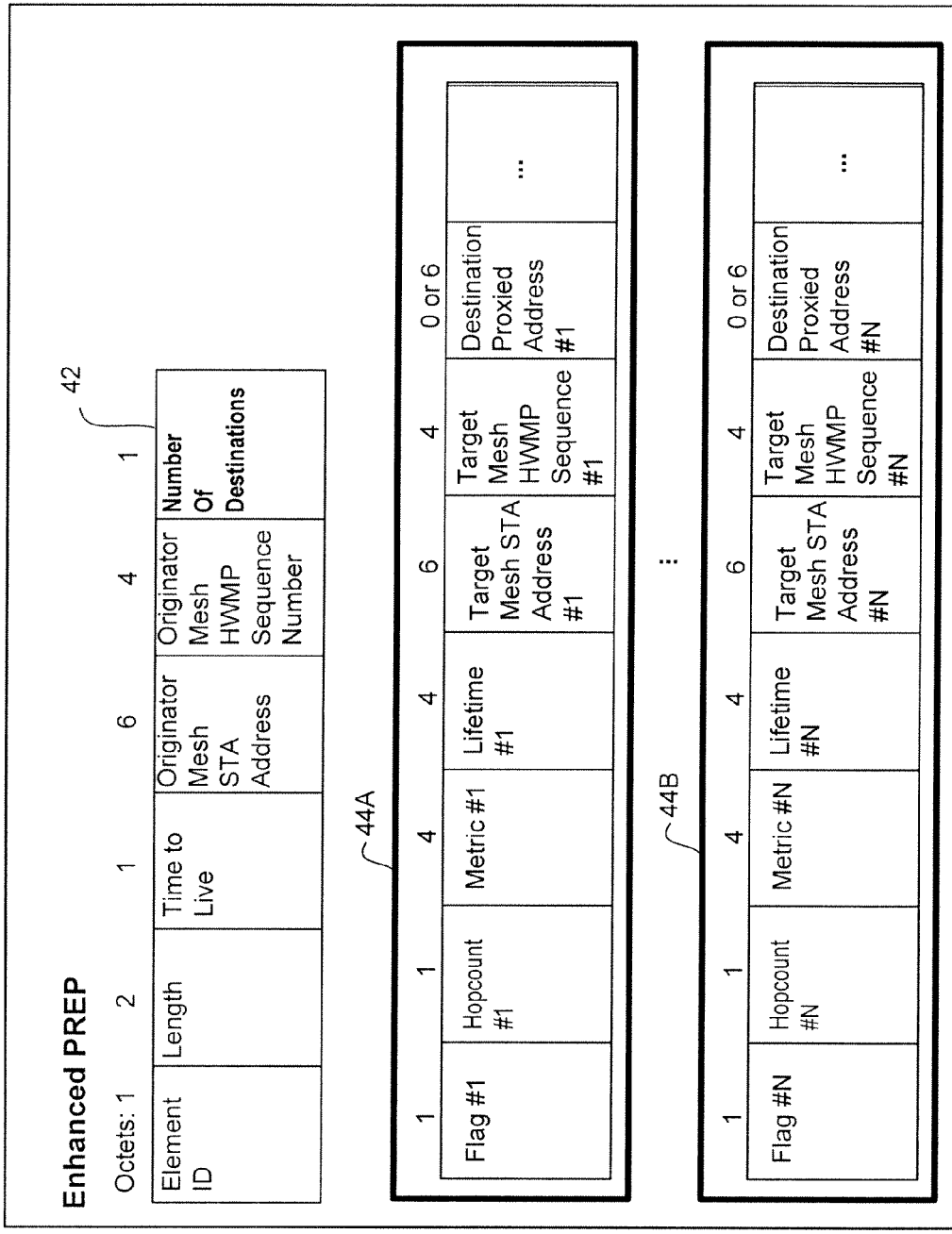
FIG. 3B is a diagram an example enhanced PREP information element used to encode multiple route information.

FIG. 3B is an example of an enhanced PREP information element 40 that can be included in an enhanced PREP message. The enhanced PREP message may be a single frame having a header, for example. The enhanced PREP information element 40 can be included in the header of the frame or a payload of the frame, for example. The enhanced PREP message may be a management frame as defined by the IEEE 802.11 family of standards, for example. The enhanced PREP information element 40 can include route information for N destination nodes, where N is an integer that is equal to or greater than one. Thus, the enhanced PREP information element 40 can be used to send routing information for multiple destinations in a single message. The information element 40 includes a field 42 that indicates the number of destination nodes for which the enhanced PREP information element 40 includes routing information. The enhanced PREP information element 40 may also include one or more routing information portions 44 (e.g. 44A, 44B, up to 44*i* where i is the number of destinations N) in which routing information for one or more respective destination nodes may be included. The enhanced PREP message 40 is used to establish one or more forward paths to one or more respective destination nodes and to confirm that destination nodes are reachable. For example, each portion 44 includes routing information for a respective destination node. The routing information in each portion 44 may include a flag field, a respective hopcount, a respective routing metric, an address of the respective target destination, a respective destination proxied address (if included), a respective dependent mesh node (or mesh point (MP) count field, respective MP MAC addresses of intermediate mesh points, etc. The particular routing information that is sent back in the enhanced PREP information element 40 may depend on the particular path selection method or protocol that is utilized. One such example path selection protocol defined by the Hybrid Wireless Mesh Protocol (HWMP) within the IEEE 802.11s draft standard uses a hierarchal routing protocol and on-demand routing protocol to address mobility. Another example is Radio Aware-Optimized Link State Routing (RA-OSLR) path selection protocol that uses multipoint relays. Other path selection protocols may be utilized.

The ID field, the Length field, the Time to Live field, the Originator Address field, and the Originator Sequence Number field of the enhanced PREP information element 40 may be the same as or similar to the corresponding fields of the prior art PREP information element 26. If the enhanced PREP information element includes routing information corresponding to multiple destination nodes, the length of the enhanced PREP information element will typically be longer than the length of a prior art PREP information element. Table 4 provides an explanation of the fields of the respective routing information portions 44 and example settings.

TABLE 4

| Field | Explanation |
|---|---|
| Flag #x | Flags for the routing information for the route to the x-th destination node. Bit 0-5: Reserved. Bit 6: Address Extension (AE) (1 = proxied address present, 0 = otherwise). Bit 7: Set to one to indicate multiple destinations requested, zero otherwise. |
| Hop Count #x | An unsigned integer set to the number of hops from the x-th destination node to the originator node. |
| Metric #x | An unsigned integer set to the cumulative metric from the x-th destination node to the originator node. |
| Lifetime #x | An unsigned integer set to the time (e.g., which may be measured in hopcounts) for which mesh nodes receiving the PREP consider the routing information corresponding to the x-th destination node to be valid. |
| Target or Destination Address #x | The MAC address of the x-th destination mesh node and may be represented as a 48-bit address as defined in 5.2 of the IEEE 802-1990 Standard. |
| Target or Destination Seq. Number #x | An unsigned integer that is the sequence number of the x-th destination node. |
| Proxied Address #x | The media access control (MAC) address of a proxied entity for which the x-th destination node acts as a proxy. This field is present if Bit 6 (AE) in Flags #x = 1. May be represented as a 48-bit address as defined in 5.2 of the IEEE 802-1990 Standard. |

Figure 4:
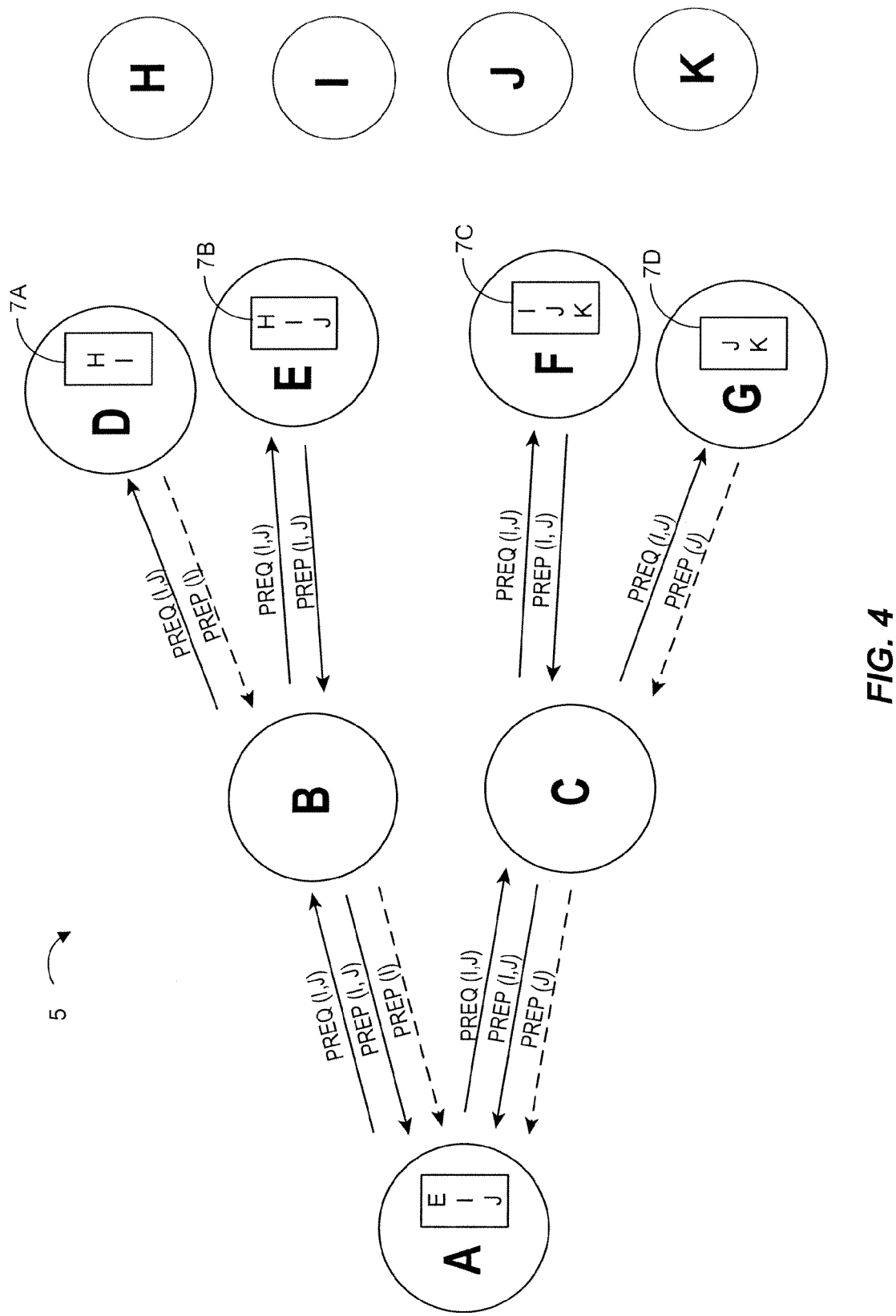
FIG. 4 is a diagram of mesh nodes utilizing the enhanced PREP information element of FIG. 3B with the enhanced PREQ information element of FIG. 2.

FIG. 4 is a diagram of mesh nodes communicating according to a similar scenario as explained with respect to FIG. 1, but where mesh nodes utilize enhanced PREP messages.

Comparing FIG. 4 with FIG. 1, it is evident that using the enhanced PREP messages decreases the traffic by reducing the number of PREP messages. In this example, each of mesh nodes E and F respond to the enhanced PREQ message using a single enhanced PREP message. The single enhanced PREP message from node E includes routing information for both nodes I and J. Similarly, the single enhanced PREP message from node F includes routing information for both nodes I and J.

Each of nodes D and G also may respond to the enhanced PREQ message using an enhanced PREP message. In this case, the enhanced PREP message from mesh node D includes routing information for mesh node I, whereas the enhanced PREP message from mesh node G includes routing information for mesh node J. As an alternative, mesh nodes D and G may respond to the enhanced PREQ message using a prior art PREP message.

Mesh nodes B and C forward the enhanced PREP messages received from mesh nodes D, E, F and G onto mesh node A. If mesh nodes D and G generate prior art PREP messages, mesh nodes B and C forward the prior art PREP messages received from mesh nodes D and G onto mesh node A.

Figure 5:
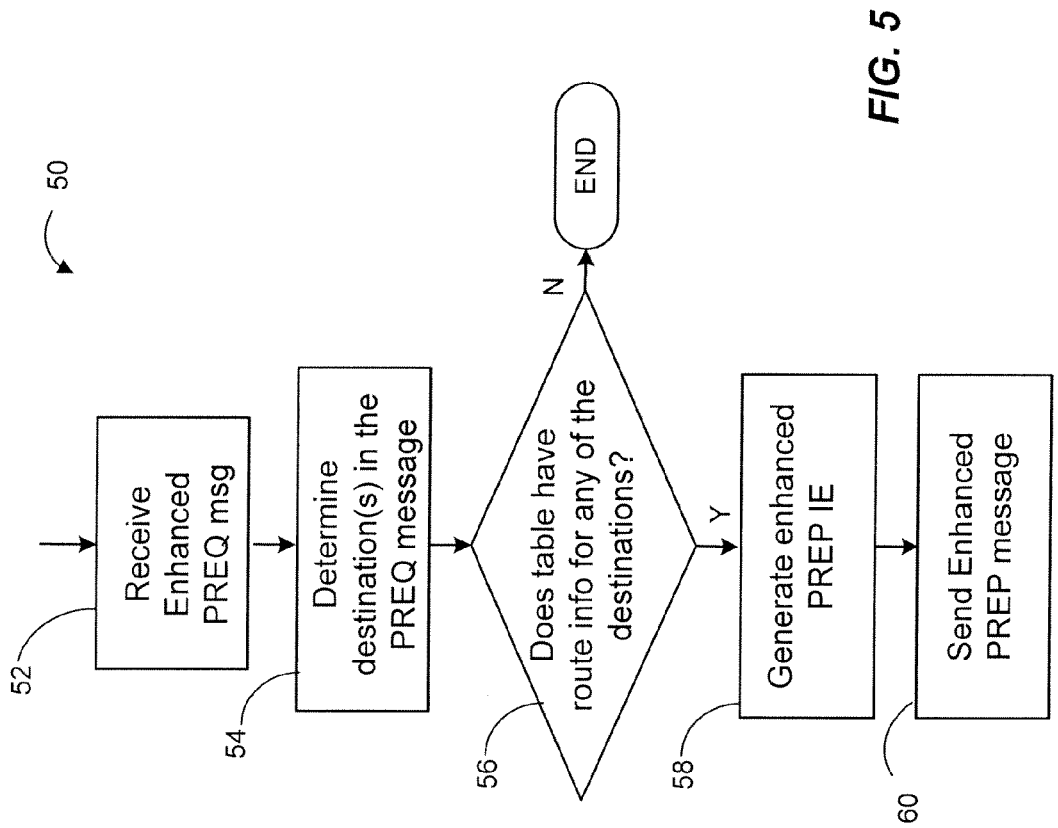
FIG. 5 is a flow diagram of an example method of processing an enhanced PREQ message having the format of FIG. 2 and conditionally responding with an enhanced PREP message having the format of FIG. 3B.

FIG. 5 is a flow diagram of an example method 50 for processing an enhanced path request (PREQ) message. The method 50 can be implemented by a mesh node such as the mesh nodes of FIG. 4. At block 52, an enhanced PREQ message is received. At block 54, one or more destination nodes (or target nodes) indicated by the enhanced PREQ message are determined. Referring to FIG. 2A, for example, the destination count field 22 and the target address fields 24A of enhanced PREQ information element may be analyzed to determine how many and which destination nodes are indicated by the enhanced PREQ message.

At block 56, routing information stored on a computer readable medium (e.g., a routing table) is examined to determine if the stored routing information includes routing information for the one or more destinations indicated by the enhanced PREQ message. If no routing information for the one or more destinations is in the stored routing information, the flow may end. If, on the other hand, routing information for at least one destination is in the stored routing information, the flow may proceed to block 58.

At block 58, an enhanced PREP information element (IE) is generated that includes routing information for one or more destination nodes obtained from the stored routing information. The enhanced PREP information element may have the format illustrated in FIG. 3, or another suitable format. If routing information for multiple destination nodes was found at block 56, generating the enhance PREP information element includes setting a field that indicates a number of destination nodes for which routing information is included and including in the enhanced PREP information element routing information for the multiple destination nodes. More generally, generating the enhanced PREP information element may include one or more of the following for each of one or more destination nodes corresponding to the PREQ message: setting a hopcount field; setting a metric field, setting a lifetime field, setting a destination (or target) mesh node (or station (STA)) address field, setting a destination (or target) mesh node sequence number (or target mesh HWMP sequence field, setting one or more intermediate node (or dependent meshpoint (MP)) address fields, and setting one or more intermediate node (or dependent meshpoint (MP)) destination sequence number fields corresponding to the one or more intermediate node address fields.

At block 60, an enhanced PREP message that includes the enhanced PREP IE generated at block 58 is transmitted along the route corresponding to the routing information included in the enhanced PREP IE.

As an alternative to the method 50 of FIG. 5, it may be determined if there is routing information for only one destination mesh node to be included in the PREP IE. If there is routing information for only one destination mesh node to be included, a prior art PREP IE may be generated and transmitted in a prior art PREP message.

As another alternative, it may be determined if the node to which the PREP message is to be transmitted is capable of processing enhanced PREP messages. For example, the node implementing the method 50 may communicate with its peer nodes to determine which if any of the peer nodes is capable of processing enhanced PREP messages. If the node to which the PREP message is to be transmitted is not capable of processing enhanced PREP messages, prior art PREP IE's may be generated and transmitted in prior art PREP messages.

Figure 6:
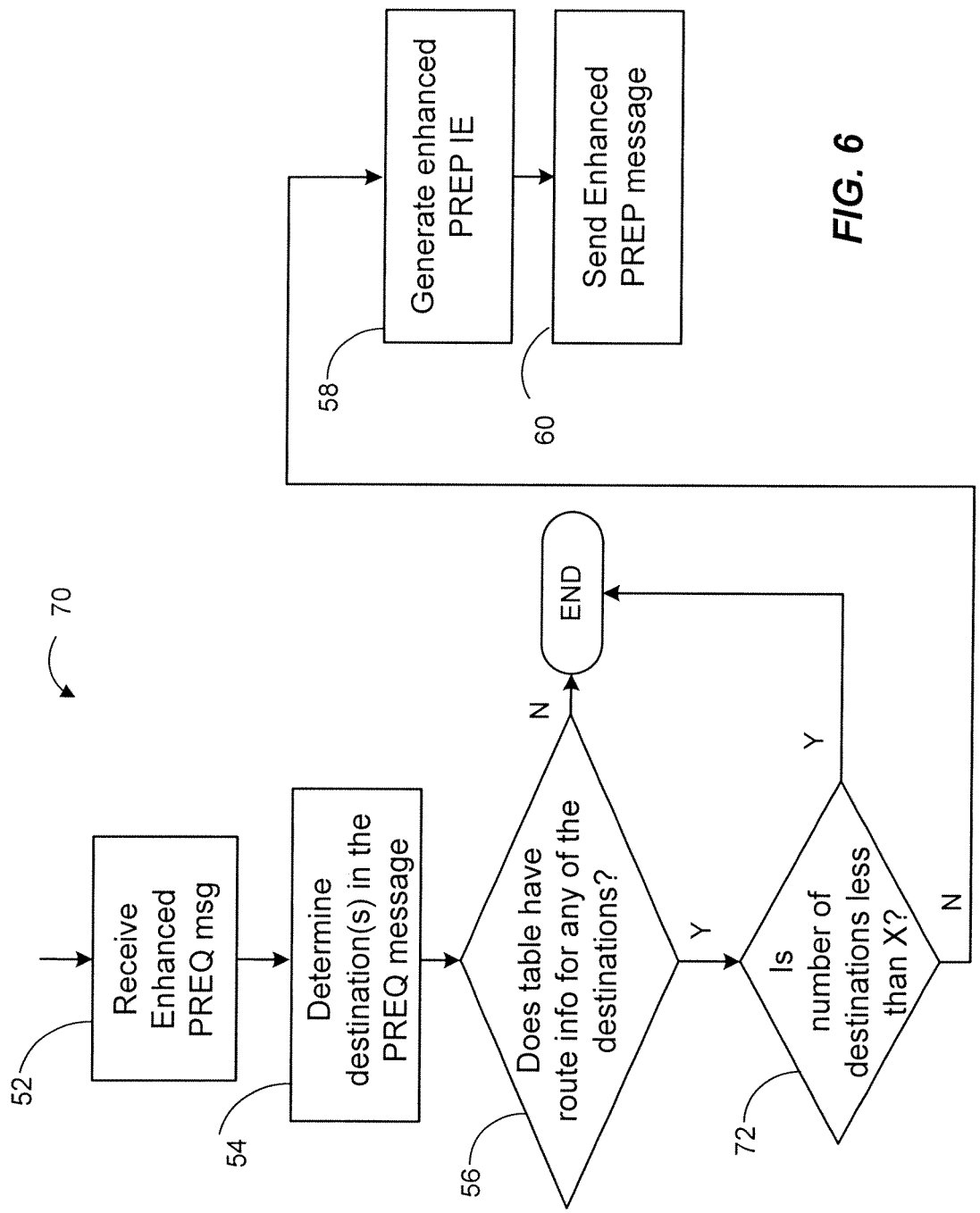
FIG. 6 is a flow diagram of another example method of processing an enhanced PREQ message having the format of FIG. 2 and conditionally responding with an enhanced PREP message having the format of FIG. 3B.

FIG. 6 is a flow diagram of another example method 70 for processing an enhanced path request (PREQ) message. The method 70 can be implemented by a mesh node such as the mesh nodes of FIG. 4. The method 70 is similar to the method 50 of FIG. 5 and includes several like-numbered blocks that will not be described further.

At block 56, routing information stored on a computer readable medium (e.g., a routing table) is examined to determine if the stored routing information includes routing information for the one or more destinations indicated by the enhanced PREQ message. If no routing information for the one or more destinations is in the stored routing information, the flow may end.

If, at block 56, routing information for at least one destination is in the stored routing information, the flow may proceed to block 72. At block 72, it may be determined if the number of destinations nodes for which routing information is in the stored information is less than an integer X. X may be a pre-configured value or it may change, for example, based on the received enhanced PREQ message. For instance, X could be set to the number N of destination nodes indicated by the enhanced PREQ message. Of course, X could be set to a variety of values such as 1, 2, 3, etc., or N−1, N−2, etc., or N/2 (rounded if non-integer), etc.

If it is determined that the number of destinations nodes for which routing information is in the stored information is less than X, the flow may end. On the other hand, if it is determined at block 72 that the number of destinations nodes for which routing information is in the stored information is greater than or equal to X, the flow may proceed to block 58.

In one alternative, a PREP message (e.g., a prior art PREP response or an enhanced PREP message) is generated if the mesh node implementing the method 70 is one of the destination nodes indicated by the enhanced PREQ message, and even though it is determined at block 72 that the number of destinations nodes for which routing information is in the stored information is less than X.

The example method 70 may be useful in dense mesh networks. In a network implementing the method 70, each of the mesh nodes that receive an enhanced PREQ message will only send back a response if they have routing information X of the requested N target destinations found in the enhanced PREQ message. If X is set to N, then an enhanced PREP message will be sent only if the node has routing information for all of the destination nodes indicated by the enhanced PREQ message. Referring now to FIG. 4, if the method 70 is implemented with X=N or X=2, the PREP responses indicated with dashed lines would not be transmitted. In this manner, the PREP message traffic as compared to the scenario illustrated in FIG. 1 will decrease by 75%.

Another potential advantage to the method 70, in at least some implementations, is the potential saving of processing power at mesh nodes that implement the method 70. For example, mesh nodes that implement the method 70 and when X is greater than one, the mesh node need not generate and transmit a PREP message when the mesh node has routing information stored in its routing table for less than X destination nodes.

Other examples where an enhanced PREP message may be used is in scenarios where a proactive PREQ mechanism is used by a mesh node to determine routing information for routes to other mesh nodes.

In FIGS. 5 and 6, blocks related to processing enhanced PREQ IEs have been omitted for reasons of clarity. For instance, flags of an enhanced PREQ message may be examined to determine whether to generate a PREP message (e.g., an enhanced PREP message), whether to forward the enhanced PREQ message, etc. For example, if the TO (or DO) bit equals one, an enhanced PREP message will not be generated and transmitted at blocks 58 and 60 unless the node implementing the method 50 or 70 is one of the destination nodes indicated by the enhanced PREQ message.

Figure 7:
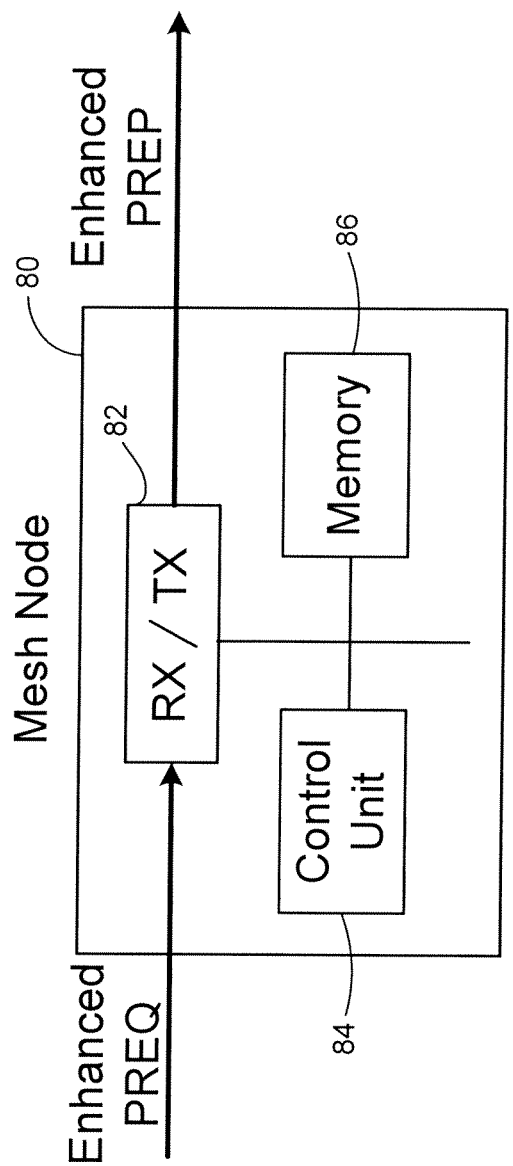
FIG. 7 is a diagram of an example communication device that may implement the method of FIG. 5 and/or the method of FIG. 6.

FIG. 7 is a diagram of an example communication device 80 that can operate as a mesh node in a mesh network such as in FIG. 4. The communication device 80 is configured to generate enhanced PREP messages such as described above and/or an enhanced PREQ message such as described above.

The example mesh node communication device 80 includes a transmitter/receiver (e.g., transceiver) 82 to receive and send messaging information via any suitable wired or wireless technique, such as according to the IEEE 802.11 family of standards or other open or private protocols, etc. Mesh node communication device 80 includes a control unit 84, such as a central processing unit (CPU) to decode, analyze, and generate messages and to determine whether a routing information stored in a computer readable medium of the device 80 (e.g., a routing table) includes routing information for requested destination nodes specified in an enhanced PREQ message. A memory 86 of the mesh node may store a routing table. If the control unit 84 is a processor, the memory 86, or another memory coupled to the processor 84, may store machine readable instructions that, when executed by the processor 84, cause the processor to perform at least some of the blocks of FIG. 5 and/or FIG. 6, such as blocks 54, 56, 58 and 70. Additionally, the control unit 84 may include hardware configured to perform one or more of the blocks of FIG. 5 and/or FIG. 6, such as one or more of the blocks 54, 56, 58 and 70. The transceiver 82 may perform the blocks 52 and 60, for example. It will be understood by those of skill in the art, in light of the disclosure and teachings provided herein, that the mesh node 70 may include additional components for processing the enhanced response technique described herein.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method comprising:
receiving a request message that requests routing information for routes between an originating node and a plurality of destination nodes;
in response to the request message, examining stored routing information in a computer readable memory for a subset of stored routing information that corresponds to one or more of the destination nodes in the plurality of destination nodes;
determining if a number of destination nodes associated with the subset of stored routing information meets a threshold value of at least two;
when the number of the destination nodes associated with the subset of stored routing information is determined to meet the threshold value, generating an information element that includes
the subset of stored routing information,
a field with a value corresponding to the number of destinations nodes associated with the subset of stored routing information,
a proxied address indicator for each of the multiple destination nodes, and
if the proxied address indicator for one of the destination nodes associated with the subset of stored routing information indicates a proxied address is included, the proxied address for the one destination node in the information element; and
transmitting the information element in a single message when the number of the destination nodes associated with the subset of stored routing information is determined to meet the threshold value; and
not transmitting any routing information in response to the request message when the number of the destination nodes associated with the subset of stored routing information is determined to not meet the threshold value.

2. A method according to claim 1, wherein the subset of stored routing information includes, for each of the destination nodes associated with the subset of stored routing information, a corresponding path metric for a route between an originating node and the corresponding destination node.

3. A method according to claim 1, wherein the subset of stored routing information includes, for each of the destination nodes associated with the subset of stored routing information, a corresponding hop count for a route between an originating node and the corresponding destination node.

4. A method according to claim 1, wherein the single message is either a data frame or management frame.

5. A method according to claim 1, wherein generating the information element comprises generating the information element only when the number of the destination nodes associated with the subset of stored routing information is determined to meet the threshold value.

6. A method according to claim 1, further comprising setting the threshold value to a number of destination nodes for which routing information is requested by the request message.

7. An apparatus comprising:
a memory;
a control unit having one or more integrated circuits configured to
examine stored routing information in the memory for a subset of stored routing information corresponding to one or more destination nodes in a plurality of destination nodes in response to a request message that requests routing information for routes between an originating node and the plurality of destination nodes, and
determine if a number of destination nodes associated with the subset of stored routing information meets a threshold value of at least two,
when the number of the destination nodes associated with the subset of stored routing information is determined to meet the threshold value, generate an information element that includes
the subset of stored routing information,
a field with a value corresponding to the number of destinations nodes associated with the subset of stored routing information,
a proxied address indicator for each of the destination nodes associated with the subset of stored routing information, and
if the proxied address indicator for one of the destination nodes associated with the subset of stored routing information indicates a proxied address is included, the proxied address for the one destination node in the information element,
cause a single message that includes the information element to be generated when the number of the destination nodes associated with the subset of stored routing information is determined to meet the threshold value,
cause the single message that includes the information element to be transmitted to another node when the number of the multiple destination nodes for which routing information is stored in the memory is determined to meet the threshold value, and
not transmit any routing information in response to the request message if the number of destination nodes associated with the subset of stored routing information is determined to not meet the threshold valve.

8. An apparatus according to claim 7, wherein the subset of stored routing information includes, for each of the destination nodes associated with the subset of stored routing information, a corresponding path metric for a route between an originating node and the corresponding destination node.

9. An apparatus according to claim 7, wherein the subset of stored routing information includes, for each of the destination nodes associated with the subset of stored routing information, a corresponding hop count for a route between an originating node and the corresponding destination node.

10. An apparatus according to claim 7, further comprising a transceiver configured (i) to receive the request message, and (ii) to transmit the single message that includes the information element when the single message that includes the information element is to be transmitted.

11. An apparatus according to claim 7, wherein the control unit comprises a processor capable of executing machine readable instructions.

12. An apparatus according to claim 7, wherein the control unit is configured to generate the information element only when the number of the destination nodes associated with the subset of stored routing information is determined to meet the threshold value.

13. An apparatus according to claim 7, wherein the control unit is configured to set the threshold value to a number of destination nodes for which routing information is requested by the request message.

14. A tangible, non-transitory computer readable storage medium having tangibly stored thereon machine readable instructions that, when executed by a processor, cause the processor to:
- examine, in response to a received request message that requests routing information for routes between an originating node and a plurality of destination nodes, stored routing information in a computer readable memory for a subset of stored routing information that corresponds to one or more of the destination nodes in the plurality of destination nodes in response to the request message;
- determine if a number of destination nodes associated with the subset of stored routing information meets a threshold value of at least two;
- when the number of the destination nodes associated with the subset of stored routing information is determined to meet the threshold value, generate an information element that includes
    - the subset of stored routing information,
    - a field with a value corresponding to the number of destinations nodes associated with the subset of stored routing information,
    - a proxied address indicator for each of the multiple destination nodes, and
    - if the proxied address indicator for one of the destination nodes associated with the subset of stored routing information indicates a proxied address is included, the proxied address for the one destination node in the information element; and
- cause the information element to be transmitted in a single message when the number of the destination nodes associated with the subset of stored routing information is determined to meet the threshold value; and
- not transmit any routing information in response to the request message when the number of the destination nodes associated with the subset of stored routing information is determined to not meet the threshold value.

15. A tangible, non-transitory computer readable storage medium of claim 14, wherein the instructions that, when executed by a processor, cause the processor to generate the information element comprises instructions that, when executed by the processor, cause the processor to:
- generate the information element only when the number of the destination nodes associated with the subset of stored routing information is determined to meet the threshold value.

16. A tangible, non-transitory computer readable storage medium of claim 14, has stored thereon machine readable instructions that, when executed by a processor, cause the processor to set the threshold value to a number of destination nodes for which routing information is requested by the request message.

* * * * *